United States Patent
Li

(10) Patent No.: US 11,151,574 B2
(45) Date of Patent: Oct. 19, 2021

(54) SMART CARD, METHOD FOR OUTPUTTING VALIDATION DATA, AND METHOD FOR RESPONDING TO OPERATION REQUEST

(71) Applicant: Tendyron Corporation, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 386 days.

(21) Appl. No.: 16/444,250

(22) Filed: Jun. 18, 2019

(65) Prior Publication Data

US 2019/0303936 A1    Oct. 3, 2019

Related U.S. Application Data

(62) Division of application No. 14/903,159, filed as application No. PCT/CN2014/081705 on Jul. 4, 2014, now abandoned.

(51) Int. Cl.

| | |
|---|---|
| *G06Q 20/40* | (2012.01) |
| *G06Q 20/34* | (2012.01) |
| *G06F 21/44* | (2013.01) |
| *G06F 21/77* | (2013.01) |
| *G07F 7/08* | (2006.01) |

(Continued)

(52) U.S. Cl.
CPC ........... *G06Q 20/409* (2013.01); *G06F 21/44* (2013.01); *G06F 21/77* (2013.01); *G06K 19/07* (2013.01); *G06Q 20/341* (2013.01); *G06Q 20/343* (2013.01); *G06Q 20/352* (2013.01); *G06Q 20/4093* (2013.01); *G07F 7/0813* (2013.01);

(Continued)

(58) Field of Classification Search
None
See application file for complete search history.

(56) References Cited

U.S. PATENT DOCUMENTS

| | | | | |
|---|---|---|---|---|
| 5,721,781 A | * | 2/1998 | Deo | ...................... G06Q 20/341 705/67 |
| 2012/0150687 A1 | * | 6/2012 | Hart | ................... G06Q 20/3821 705/26.41 |

FOREIGN PATENT DOCUMENTS

KR    101339016 B1 * 12/2013

OTHER PUBLICATIONS

FFIEC—Federal Financial Institutions Examination Council, "Authentication in an Internet Banking Environment" (Year: 2005).*

* cited by examiner

*Primary Examiner* — Neha Patel
*Assistant Examiner* — Gabriel Mercado
(74) *Attorney, Agent, or Firm* — Maginot, Moore & Beck, LLP

(57) ABSTRACT

A smart card, a method for outputting validation data, and a method for responding to an operation request are provided. The method for outputting validation data includes acquiring an operation request by a smart card; acquiring smart card operation information of the smart card by the smart card, after acquiring the operation request, wherein the smart card operation information comprises at least a smart card mode factor for indicating a working mode of the smart card, and the working mode of the smart card comprises a non-contact communication mode and/or a contact communication mode; acquiring a validation data generating strategy, and using the validation data generating strategy to process at least the smart card operation information to obtain valida- (Continued)

tion data by the smart card; outputting the validation data by the smart card after obtaining the validation data.

17 Claims, 4 Drawing Sheets

(51) Int. Cl.
*G07F 7/12* (2006.01)
*G06K 19/07* (2006.01)
*G07F 19/00* (2006.01)

(52) U.S. Cl.
CPC ................ *G07F 7/12* (2013.01); *G07F 7/122* (2013.01); *G07F 19/00* (2013.01)

SMART CARD, METHOD FOR OUTPUTTING VALIDATION DATA, AND METHOD FOR RESPONDING TO OPERATION REQUEST

CROSS-REFERENCE TO RELATED APPLICATION

The present application is a divisional application of U.S. patent application Ser. No. 14/903,159, filed Jan. 6, 2016, the entire disclosure of which is incorporated herein by reference. The '159 Application claims priority under 35 U.S.C 371 to, and is a U.S. National Stage application of, International Patent Application No. PCT/CN2014/081705, filed Jul. 4, 2014, which claims the benefit of prior Chinese Application No. 201310289064.3, filed Jul. 10, 2013, Chinese Application No. 201310289234.8, filed Jul. 10, 2013, Chinese Application No. 201310289162.7, filed Jul. 10, 2013, Chinese Application No. 201310289150.4, filed Jul. 10, 2013, Chinese Application No. 201320410015.6, filed Jul. 10, 2013, and Chinese Application No. 201310300386.3, filed Jul. 17, 2013 The entire contents of the above-mentioned patent applications are incorporated herein by reference as part of the disclosure of this application.

FIELD

The present disclosure relates to a field of information security technology, and more particularly to a smart card, a method for outputting validation data, and a method and a system for responding to an operation request.

BACKGROUND

At present, most bank cards of the users are magnetic stripe cards. However, the magnetic stripe card has a problem that once the account number and the transaction password of the user are acquired, a magnetic stripe card may be duplicated, and thus the user information may be stolen, leading to a property loss to the user.

Therefore, preferably, the IC card (smart card) is now used to replace the magnetic stripe card in order to ensure the security of information and property of the user. The current smart card has an internal chip including two types of card operation mode: a contact operation mode and a non-contact operation mode. The chip determines which operation mode is employed and which protocol is called to participate in the information transmission when transmitting information to outside. Moreover, during the information transmission, the chip may process the information to be outputted, including operations such as encrypting or signing. Furthermore, the secret key for encrypting or signing cannot be read out or duplicated, and thus the smart card replacing the magnetic stripe card may prevent the card from being duplicated. Even the account number and the transaction password of the user are acquired, it is difficult to duplicate an identical card, thus ensuring the security of information and property of the user to some extent.

However, if the account number and the transaction password of the user are acquired, there is still a hidden danger of security for the current smart card. FIG. 1 is a schematic diagram showing stealing user information with the current smart card. Referring to FIG. 1, the ATM 101 is connected to the server 102 of the bank via wired or wireless mode, so as to implement corresponding businesses of the bank. In the normal case, the smart card 106 held by the user may be inserted into the ATM 101 directly to implement businesses such as account transfer, cash withdrawal. However, if the thief makes a copy card 103 and inserts the copy card 103 into the ATM for only imitating the smart card 106 held by the user to be inserted into the ATM 101, to receive the information sent by the ATM 101 and to send information to the ATM 101. In this case, the copy card 103 transmits the received information sent by the ATM 101 to the first stealing terminal 104 disposed by the thief via wireless mode. The first stealing terminal 104 is configured to receive the information sent by the copy card 103 and to send information to the copy card 103. The first stealing terminal 104 may be connected with the copy card 103 via wired or wireless mode. The first stealing terminal 104 is connected to the second stealing terminal 105 via internet or wireless network. The second stealing terminal 105 is a mobile terminal taken along with the thief and is provided with a high power RF (radio frequency) antenna 106. The second stealing terminal 105 may scan the smart card 107 held by the user around the antenna via the antenna 106. Because the current smart card 107 can only passively receive information, it is easy for the second stealing terminal 105 to establish wireless connection with the smart card 107 held by the user via the antenna 106. In this way, the second stealing terminal 105 may acquire the smart card information from the smart card 107 held by the user and send the acquired smart card information to the first stealing terminal 104 via internet or wireless network, thus sending the acquired smart card information to the ATM 101 via the copy card 103. After the ATM acquires the true information of the smart card 107 held by the user, businesses such as account transfer or cash withdrawal may be handled on the ATM after the transaction password of the smart card 107 is inputted on the ATM 101. It can be seen that by this means, for the current smart card, once the account information and the transaction password are released, a huge property loss may be caused to the user. Moreover, such property loss cannot be avoided, because it is difficult to confirm the identity of the thief due to the mobility of the thief.

SUMMARY

Embodiments of the present disclosure seek to solve a hidden danger of security for a current smart card.

One main object of the present disclosure is to provide a method for outputting validation data.

Another object of the present disclosure is to provide a smart card.

Yet another object of the present disclosure is to provide a method for responding to an operation request.

Yet another object of the present disclosure is to provide a system for responding to an operation request.

In order to achieve above objects, the specific technical solution of the present disclosure is realized in following manner.

According to an aspect of the present disclosure, a method for outputting validation data is provided, including: acquiring an operation request by a smart card; acquiring smart card operation information of the smart card by the smart card, after acquiring the operation request, wherein the smart card operation information includes at least a smart card mode factor for indicating a working mode of the smart card; acquiring a validation data generating strategy, and using the validation data generating strategy to process at least the smart card operation information to obtain validation data by the smart card; outputting the validation data by the smart card after obtaining the validation data.

Furthermore, the method for outputting validation data further includes: establishing a communication with a terminal by the smart card, and acquiring the operation request from the terminal via the communication by the smart card.

Furthermore, the method for outputting validation data further includes: acquiring an outputting strategy corresponding to the validation data, and outputting the validation data according to the outputting strategy of the validation data by the smart card.

Furthermore, the smart card acquires the validation data generating strategy corresponding to the smart card operation information from pre-stored validation data generating strategies.

Furthermore, using the validation data generating strategy to process at least the smart card operation information to obtain the validation data by the smart card, includes: processing the smart card operation information to obtain first validation data, and processing a balance of an electronic deposit, an online transaction number of an electronic deposit, a transaction amount, a transaction type identification, a terminal number, a transaction date and a transaction time to obtain second validation data, and using a combination of the first validation data and the second validation data as the validation data by the smart card.

Furthermore, using the validation data generating strategy to process at least the smart card operation information to obtain the validation data by the smart card, includes: processing the smart card operation information, a balance of an electronic deposit, an online transaction number of an electronic deposit, a transaction amount, a transaction type identification, a terminal number, a transaction date and a transaction time by the smart card to obtain the validation data.

Furthermore, the method further includes: determining whether the operation request is a pre-stored target request; if yes, using the validation data generating strategy to process at least the smart card operation information.

Furthermore, the processing step includes: an encryption processing.

Furthermore, the encryption processing includes: at least performing an MAC calculation on the smart card operation information by the smart card, if the validation data generating strategy is an MAC calculation strategy; at least performing an HASH calculation on the smart card operation information by the smart card, if the validation data generating strategy is an HASH calculation strategy; at least performing a signature calculation on the smart card operation information by the smart card, if the validation data generating strategy is a signature strategy.

Furthermore, the smart card operation information further includes: a random number and/or a transaction count value.

Furthermore, the working mode of the smart card includes a communication mode of the smart card.

Furthermore, the communication mode of the smart card includes a non-contact communication mode and/or a contact communication mode.

Furthermore, the contact communication mode includes: a chip communication mode and/or a magnetic stripe communication mode.

Furthermore, the working mode of the smart card is determined according to a type of an object connected with the smart card.

According to another aspect of the present disclosure, a method for responding to an operation request is provided, including: outputting at least validation data by a smart card using the method described above; acquiring the validation data and transmitting at least the operation request and the validation data to a background system server by a terminal; after receiving the validation data and the operation request, validating the validation data by the background system server, and after the validation is passed, performing responding to the operation request by the background system server.

Furthermore, validating the validation data by the background system server, includes: acquiring a communication mode of the terminal and acquiring a target strategy identical to the validation data generating strategy acquired by the smart card by the background system server; validating the communication mode of the terminal using the target strategy to generate first validation information by the background system server; comparing the first validation information with validation data corresponding to the smart card mode factor in the validation data by the background system server; passing the validation, if the first validation information is identical to the validation data corresponding to the smart card mode factor in the validation data; failing the validation, if the first validation information is different from the validation data corresponding to the smart card mode factor in the validation data.

Furthermore, the validation data further includes data obtained by processing the type of the object connected with the smart card, validating the validation data by the background system server, further includes: acquiring an object type of the terminal by the background system server; validating the object type of the terminal using the target strategy to generate second validation information by the background system server; comparing the second validation information with validation data corresponding to the type of the object connected with the smart card in the validation data by the background system server; passing the validation, if the second validation information is identical to the validation data corresponding to the type of the object connected with the smart card in the validation data; failing the validation, if the second validation information is different from the validation data corresponding to the type of the object connected with the smart card in the validation data.

According to yet another aspect of the present disclosure, a smart card is provided, including: an acquiring module, a processing module and an outputting module, wherein the acquiring module is configured to acquire an operation request, to acquire smart card operation information of the smart card after the operation request is acquired, and to acquire a validation data generating strategy, in which the smart card operation information includes at least a smart card mode factor for indicating a working mode of the smart card; the processing module is configured to use the validation data generating strategy to process at least the smart card operation information to obtain validation data; the outputting module is configured to output the validation data after the validation data is obtained by the processing module.

Furthermore, the smart card further includes: a communicating module, configured to establish a communication with a terminal and to output the validation data according to an outputting strategy of the validation data.

Furthermore, the processing module is configured to process the smart card operation information to obtain first validation data, to process a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data.

Furthermore, the processing module is configured to process the smart card operation information, a balance of an electronic deposit, an online transaction number of an electronic deposit, a transaction amount, a transaction type identification, a terminal number, a transaction date and a transaction time to obtain the validation data.

Furthermore, the smart card further includes a determining module, configured to determine whether the operation request is a pre-stored target request after the operation request is acquired by the acquiring module, and to indicate the processing module to use the validation data generating strategy to process at least the smart card operation information if the operation request is determined as the target request.

Furthermore, the processing module is further configured to encrypt at least the smart card operation information using the validation data generating strategy.

Furthermore, the processing module is configured to: at least perform an MAC calculation on the smart card operation information, if the validation data generating strategy is an MAC calculation strategy; at least perform an HASH calculation on the smart card operation information, if the validation data generating strategy is an HASH calculation strategy; at least perform a signature calculation on the smart card operation information, if the validation data generating strategy is a signature strategy.

Furthermore, the smart card operation information further includes: a random number and/or a transaction count value.

Furthermore, the working mode of the smart card includes a communication mode of the smart card.

Furthermore, the communication mode of the smart card includes a non-contact communication mode and/or a contact communication mode.

Furthermore, the contact communication mode includes: a chip communication mode and/or a magnetic stripe communication mode.

Furthermore, the working mode of the smart card is determined according to a type of an object connected with the smart card.

According to yet another aspect of the present disclosure, a system for responding to an operation request is provided, including: a terminal, a background system server and the smart card described above, wherein the terminal is configured to acquire the validation data and to transmit at least the operation request and the validation data to the background system server; the background system server includes a receiving module, a validating module and a performing module; the receiving module is configured to receive the validation data and the operation request transmitted by the terminal; the validating module is configured to validate the validation data after the validation data and the operation request are received by the receiving module; the performing module is configured to perform responding to the operation request after the validation is passed by the validating module.

Furthermore, the background system server further includes an acquiring module configured to acquire a communication mode of the terminal and to acquire a target strategy identical to the validation data generating strategy acquired by the smart card; the validating module is further configured to validate the communication mode of the terminal using the target strategy to generate first validation information, to compare the first validation information with validation data corresponding to the smart card mode factor in the validation data, to pass the validation if the first validation information is identical to the validation data corresponding to the smart card mode factor in the validation data, and to fail the validation if the first validation information is different from the validation data corresponding to the smart card mode factor in the validation data.

Furthermore, the validation data further includes data obtained by processing the type of the object connected with the smart card, the background system server further includes an acquiring module configured to acquire an object type of the terminal; the validating module is further configured to validate the communication mode information of the terminal using the target strategy to generate second validation information; to compare the second validation information with validation data corresponding to the type of the object connected with the smart card in the validation data, to pass the validation if the second validation information is identical to the validation data corresponding to the type of the object connected with the smart card in the validation data, and to fail the validation if the second validation information is different from the validation data corresponding to the type of the object connected with the smart card in the validation data.

A computer readable medium is provided, including computer instructions, when executed, configured to implement the method for outputting validation data or the method for responding to the operation request.

According to an aspect of the present disclosure, a method for outputting validation data is provided, including: establishing a communication by a smart card; acquiring an operation request from a terminal via the communication by the smart card after establishing the communication; acquiring smart card operation information upon an interaction between the smart card and the terminal by the smart card after acquiring the operation request, wherein the smart card operation information includes at least a smart card mode factor for indicating a working mode of the smart card; acquiring a validation data generating strategy corresponding to the smart card operation information from pre-stored validation data generating strategies by the smart card, using the validation data generating strategy corresponding to the smart card operation information to process at least the smart card operation information to obtain the validation data by the smart card; acquiring an outputting strategy corresponding to the validation data, and outputting the validation data according to the outputting strategy of the validation data by the smart card after acquiring the validation data.

Furthermore, using the validation data generating strategy corresponding to the smart card operation information to process at least the smart card operation information to obtain the validation data by the smart card, includes: processing the smart card operation information to obtain first validation data, and processing a balance of an electronic deposit, an online transaction number of an electronic deposit, a transaction amount, a transaction type identification, a terminal number, a transaction date and a transaction time to obtain second validation data, and using a combination of the first validation data and the second validation data as the validation data by the smart card.

Furthermore, using the validation data generating strategy corresponding to the smart card operation information to process at least the smart card operation information to obtain the validation data by the smart card, includes: processing the smart card operation information, a balance of an electronic deposit, an online transaction number of an electronic deposit, a transaction amount, a transaction type identification, a terminal number, a transaction date and a transaction time by the smart card to obtain the validation data.

Furthermore, after acquiring an operation request from a terminal via the communication by the smart card, and before using the validation data generating strategy corresponding to the smart card operation information to process at least the smart card operation information, the method further includes: determining whether the operation request is a pre-stored target request; if yes, using the validation data generating strategy corresponding to the smart card operation information to process at least the smart card operation information.

Furthermore, the processing step includes: an encryption processing.

Furthermore, the encryption processing includes: at least performing an MAC calculation on the smart card operation information by the smart card, if the validation data generating strategy corresponding to the smart card operation information is an MAC calculation strategy; at least performing an HASH calculation on the smart card operation information by the smart card, if the validation data generating strategy corresponding to the smart card operation information is an HASH calculation strategy; at least performing a signature calculation on the smart card operation information by the smart card, if the validation data generating strategy corresponding to the smart card operation information is a signature strategy.

Furthermore, the smart card operation information further includes: a random number and/or a transaction count value.

Furthermore, the working mode of the smart card includes a communication mode of the smart card.

Furthermore, the communication mode of the smart card includes a non-contact communication mode and/or a contact communication mode.

Furthermore, the contact communication mode includes: a chip communication mode and/or a magnetic stripe communication mode.

Furthermore, the working mode of the smart card is determined according to a type of an object connected with the smart card.

According to another aspect of the present disclosure, a method for responding to an operation request is provided, including: outputting at least validation data by a smart card using the method described above; acquiring the validation data and transmitting at least the operation request and the validation data to a background system server by a terminal; after receiving the validation data and the operation request, validating the validation data by the background system server, and after the validation is passed, performing responding to the operation request by the background system server.

Furthermore, validating the validation data by the background system server, includes: acquiring a communication mode of the terminal and acquiring a target strategy identical to the validation data generating strategy acquired by the smart card by the background system server; validating the communication mode of the terminal using the target strategy to generate first validation information by the background system server; comparing the first validation information with validation data corresponding to the smart card mode factor in the validation data by the background system server; passing the validation, if the first validation information is identical to the validation data corresponding to the smart card mode factor in the validation data; failing the validation, if the first validation information is different from the validation data corresponding to the smart card mode factor in the validation data.

Furthermore, the validation data further includes data obtained by processing the type of the object connected with the smart card, validating the validation data by the background system server, further includes: acquiring an object type of the terminal by the background system server; validating the object type of the terminal using the target strategy to generate second validation information by the background system server; comparing the second validation information with validation data corresponding to the type of the object connected with the smart card in the validation data by the background system server; passing the validation, if the second validation information is identical to the validation data corresponding to the type of the object connected with the smart card in the validation data; failing the validation, if the second validation information is different from the validation data corresponding to the type of the object connected with the smart card in the validation data.

According to yet another aspect of the present disclosure, a smart card is provided, including: a communicating module, an acquiring module and a processing module, wherein the communicating module is configured to establish a communication, and to output validation data according to an outputting strategy of the validation data; the acquiring module is configured to acquire an operation request from a terminal via the communication after the communication is established by the communicating module, and to acquire smart card operation information upon an interaction between the smart card and the terminal after the operation request is acquired, wherein the smart card operation information includes at least a smart card mode factor for indicating a working mode of the smart card, to acquire a validation data generating strategy corresponding to the smart card operation information from pre-stored validation data generating strategies, and to acquire the outputting strategy corresponding to the validation data after the validation data is obtained by the processing module; the processing module is configured to use the validation data generating strategy corresponding to the smart card operation information to process at least the smart card operation information to obtain the validation data.

Furthermore, the processing module is configured to process the smart card operation information to obtain first validation data, to process a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data.

Furthermore, the processing module is configured to process the smart card operation information, a balance of an electronic deposit, an online transaction number of an electronic deposit, a transaction amount, a transaction type identification, a terminal number, a transaction date and a transaction time to obtain the validation data.

Furthermore, the smart card further includes a determining module, configured to determine whether the operation request is a pre-stored target request after the operation request is acquired by the acquiring module, and to indicate the processing module to use the validation data generating strategy to process at least the smart card operation information if the operation request is determined as the target request.

Furthermore, the processing module is further configured to encrypt at least the smart card operation information using the validation data generating strategy.

Furthermore, the processing module is configured to: at least perform an MAC calculation on the smart card operation information, if the validation data generating strategy is an MAC calculation strategy; at least perform an HASH calculation on the smart card operation information, if the validation data generating strategy is an HASH calculation strategy; at least perform a signature calculation on the smart card operation information, if the validation data generating strategy is a signature strategy.

Furthermore, the smart card operation information further includes: a random number and/or a transaction count value.

Furthermore, the working mode of the smart card includes a communication mode of the smart card.

Furthermore, the communication mode of the smart card includes a non-contact communication mode and/or a contact communication mode.

Furthermore, the contact communication mode includes: a chip communication mode and/or a magnetic stripe communication mode.

Furthermore, the working mode of the smart card is determined according to a type of an object connected with the smart card.

According to yet another aspect of the present disclosure, a system for responding to an operation request is provided, including: a terminal, a background system server and the smart card described above, wherein the terminal is configured to acquire the validation data and to transmit at least the operation request and the validation data to the background system server; the background system server includes a receiving module, a validating module and a performing module; the receiving module is configured to receive the validation data and the operation request transmitted by the terminal; the validating module is configured to validate the validation data after the validation data and the operation request are received by the receiving module; the performing module is configured to perform responding to the operation request after the validation is passed by the validating module.

Furthermore, the background system server further includes an acquiring module configured to acquire a communication mode of the terminal and to acquire a target strategy identical to the validation data generating strategy acquired by the smart card; the validating module is further configured to validate the communication mode of the terminal using the target strategy to generate first validation information, to compare the first validation information with validation data corresponding to the smart card mode factor in the validation data, to pass the validation if the first validation information is identical to the validation data corresponding to the smart card mode factor in the validation data, and to fail the validation if the first validation information is different from the validation data corresponding to the smart card mode factor in the validation data.

Furthermore, the validation data further includes data obtained by processing the type of the object connected with the smart card, the background system server further comprises an acquiring module configured to acquire an object type of the terminal; the validating module is further configured to validate the communication mode information of the terminal using the target strategy to generate second validation information; to compare the second validation information with validation data corresponding to the type of the object connected with the smart card in the validation data, to pass the validation if the second validation information is identical to the validation data corresponding to the type of the object connected with the smart card in the validation data, and to fail the validation if the second validation information is different from the validation data corresponding to the type of the object connected with the smart card in the validation data.

It may be seen from the technical solution provided by the present disclosure that, the smart card generates the validation data according to the smart card operation information of the smart card, and the background system server performs the flow of responding to the operation request after the validation data passes the validation, so as to prevent user information from being stolen, to improve a security of the smart card, and to ensure a security of information and property of a user.

According to an aspect of the present disclosure, a method for outputting validation data is provided, including: acquiring an operation request by a smart card; acquiring smart card operation information of the smart card by the smart card, after acquiring the operation request, wherein the smart card operation information includes at least a smart card mode factor for indicating a working mode of the smart card, the working mode of the smart card includes a communication mode of the smart card, and the communication mode of the smart card includes a contact communication mode and/or a non-contact communication mode; acquiring a validation data generating strategy, and using the validation data generating strategy to process at least the smart card operation information to obtain validation data by the smart card; outputting the validation data by the smart card according to a pre-stored outputting strategy after obtaining the validation data.

Furthermore, using the validation data generating strategy to process at least the smart card operation information to obtain the validation data by the smart card, includes: processing the smart card operation information to obtain first validation data, and processing a balance of an electronic deposit, an online transaction number of an electronic deposit, a transaction amount, a transaction type identification, a terminal number, a transaction date and a transaction time to obtain second validation data, and using a combination of the first validation data and the second validation data as the validation data by the smart card.

Furthermore, using the validation data generating strategy to process at least the smart card operation information to obtain the validation data by the smart card, includes: processing the smart card operation information, a balance of an electronic deposit, an online transaction number of an electronic deposit, a transaction amount, a transaction type identification, a terminal number, a transaction date and a transaction time by the smart card to obtain the validation data.

Furthermore, after acquiring the operation request, and before using the validation data generating strategy to process at least the smart card operation information, the method further includes: determining whether the operation request is a pre-stored target request; if yes, using the validation data generating strategy to process at least the smart card operation information.

Furthermore, the processing step includes: an encryption processing.

Furthermore, the encryption processing includes: at least performing an MAC calculation on the smart card operation information by the smart card, if the validation data generating strategy is an MAC calculation strategy; at least performing an HASH calculation on the smart card operation information by the smart card, if the validation data generating strategy is an HASH calculation strategy; at least performing a signature calculation on the smart card operation information by the smart card, if the validation data generating strategy is a signature strategy.

Furthermore, the smart card operation information further includes: a random number and/or a transaction count value.

Furthermore, the contact communication mode includes: a chip communication mode and/or a magnetic stripe communication mode.

Furthermore, the working mode of the smart card is determined according to a type of an object connected with the smart card.

According to another aspect of the present disclosure, a method for responding to an operation request is provided, including: outputting at least validation data by a smart card using the method described above; acquiring the validation data and transmitting at least the operation request and the validation data to a background system server by a terminal; after receiving the validation data and the operation request, validating the validation data by the background system server, and after the validation is passed, performing responding to the operation request by the background system server.

Furthermore, validating the validation data by the background system server, includes: acquiring a communication mode of the terminal and acquiring a target strategy identical to the validation data generating strategy acquired by the smart card by the background system server; validating the communication mode of the terminal using the target strategy to generate first validation information by the background system server; comparing the first validation information with validation data corresponding to the smart card mode factor in the validation data by the background system server; passing the validation, if the first validation information is identical to the validation data corresponding to the smart card mode factor in the validation data; failing the validation, if the first validation information is different from the validation data corresponding to the smart card mode factor in the validation data.

Furthermore, the validation data further includes data obtained by processing the type of the object connected with the smart card, validating the validation data by the background system server, further includes: acquiring an object type of the terminal by the background system server; validating the object type of the terminal using the target strategy to generate second validation information by the background system server; comparing the second validation information with validation data corresponding to the type of the object connected with the smart card in the validation data by the background system server; passing the validation, if the second validation information is identical to the validation data corresponding to the type of the object connected with the smart card in the validation data; failing the validation, if the second validation information is different from the validation data corresponding to the type of the object connected with the smart card in the validation data.

According to yet another aspect of the present disclosure, a smart card is provided, including: an acquiring module, a processing module and an outputting module, wherein the acquiring module is configured to acquire an operation request, to acquire smart card operation information of the smart card after the operation request is acquired, and to acquire a validation data generating strategy, the smart card operation information includes at least a smart card mode factor for indicating a working mode of the smart card, the working mode of the smart card includes a communication mode of the smart card, and the communication mode of the smart card includes a contact communication mode and/or a non-contact communication mode; the processing module is configured to use the validation data generating strategy to process at least the smart card operation information to obtain validation data; the outputting module is configured to output the validation data after the validation data is obtained by the processing module.

Furthermore, the processing module is configured to process the smart card operation information to obtain first validation data, to process a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data.

Furthermore, the processing module is configured to process the smart card operation information, a balance of an electronic deposit, an online transaction number of an electronic deposit, a transaction amount, a transaction type identification, a terminal number, a transaction date and a transaction time to obtain the validation data.

Furthermore, the smart card further includes a determining module, configured to determine whether the operation request is a pre-stored target request after the operation request is acquired by the acquiring module, and to indicate the processing module to use the validation data generating strategy to process at least the smart card operation information if the operation request is determined as the target request.

Furthermore, the processing module is further configured to encrypt at least the smart card operation information using the validation data generating strategy.

Furthermore, the processing module is configured to: at least perform an MAC calculation on the smart card operation information, if the validation data generating strategy is an MAC calculation strategy; at least perform an HASH calculation on the smart card operation information, if the validation data generating strategy is an HASH calculation strategy; at least perform a signature calculation on the smart card operation information, if the validation data generating strategy is a signature strategy.

Furthermore, the smart card operation information further includes: a random number and/or a transaction count value.

Furthermore, the contact communication mode includes: a chip communication mode and/or a magnetic stripe communication mode.

Furthermore, the working mode of the smart card is determined according to a type of an object connected with the smart card.

According to yet another aspect of the present disclosure, a system for responding to an operation request is provided, including: a terminal, a background system server and the smart card described above, wherein the terminal is configured to acquire the validation data and to transmit at least the operation request and the validation data to the background system server; the background system server includes a receiving module, a validating module and a performing module; the receiving module is configured to receive the validation data and the operation request transmitted by the terminal; the validating module is configured to validate the validation data after the validation data and the operation request are received by the receiving module; the performing module is configured to perform responding to the operation request after the validation is passed by the validating module.

Furthermore, the background system server further includes an acquiring module configured to acquire a communication mode of the terminal and to acquire a target strategy identical to the validation data generating strategy acquired by the smart card; the validating module is further configured to validate the communication mode of the terminal using the target strategy to generate first validation information, to compare the first validation information with validation data corresponding to the smart card mode factor in the validation data, to pass the validation if the first validation information is identical to the validation data corresponding to the smart card mode factor in the validation data, and to fail the validation if the first validation information is different from the validation data corresponding to the smart card mode factor in the validation data.

Furthermore, the validation data further includes data obtained by processing the type of the object connected with the smart card, the background system server further includes an acquiring module configured to acquire an object type of the terminal; the validating module is further configured to validate the communication mode information of the terminal using the target strategy to generate second validation information; to compare the second validation information with validation data corresponding to the type of the object connected with the smart card in the validation data, to pass the validation if the second validation information is identical to the validation data corresponding to the type of the object connected with the smart card in the validation data, and to fail the validation if the second validation information is different from the validation data corresponding to the type of the object connected with the smart card in the validation data.

It may be seen from the technical solution provided by the present disclosure that, the smart card generates the validation data according to the smart card operation information of the smart card, and the background system server performs the flow of responding to the operation request after the validation data passes the validation, so as to prevent user information from being stolen, to improve a security of the smart card, and to ensure a security of information and property of a user.

A method for processing information is provided, including: acquiring an operation request by a smart card; detecting by the smart card a communication mode currently used by the smart card after acquiring the operation request, wherein the communication mode of the smart card includes a contact communication mode and/or a non-contact communication mode; performing by the smart card at least outputting smart card communication mode information for indicating the communication mode currently used by the smart card; acquiring the smart card communication mode information by the terminal; transmitting the smart card communication mode information by the terminal; acquiring by a background system server the smart card communication mode information and terminal communication mode information of the terminal for indicating a communication mode used by the terminal when transmitting the operation request; comparing the terminal communication mode information with the smart card communication mode information by the background system server; performing processing the operation request by the background system server after acquiring the operation request, if the terminal communication mode information is identical to the smart card communication mode information.

Performing by the smart card at least outputting smart card communication mode information, includes: acquiring a validation data generating strategy, and using the validation data generating strategy to process at least the smart card communication mode information to obtain validation data by the smart card; comparing the terminal communication mode information with the smart card communication mode information by the background system server, includes: acquiring the validation data generating strategy, and using the validation data generating strategy to process at least the terminal communication mode information to obtain validation information by the background system server; comparing the validation information with the validation data by the background system server.

The smart card communication mode information outputted by the smart card includes any information as follows: first smart card communication mode information being the communication mode currently used by the smart card; second smart card communication mode information being the communication mode currently used by the smart card and a random number; third smart card communication mode information being the communication mode currently used by the smart card and a transaction count value; fourth smart card communication mode information being the communication mode currently used by the smart card, a random number, and a transaction count value. The terminal communication mode information acquired by the background system server is a communication mode used by the terminal when transmitting the operation request if the smart card communication mode information is the first smart card communication mode information. The terminal communication mode information is the communication mode used by the terminal when transmitting the operation request and the random number if the smart card communication mode information is the second smart card communication mode information. The terminal communication mode information is the communication mode used by the terminal when transmitting the operation request and the transaction count value if the smart card communication mode information is the third smart card communication mode information. The terminal communication mode information is the communication mode used by the terminal when transmitting the operation request, the random number and the transaction count value if the smart card communication mode information is the fourth smart card communication mode information.

The validation data includes first validation data and second validation data. The first validation data is obtained by processing the smart card communication mode information by the smart card; the second validation data is obtained by processing a balance of an electronic deposit, an online transaction number of an electronic deposit, a transaction amount, a transaction type identification, a terminal number, a transaction date and a transaction time by the smart card. The validation information includes first validation information and second validation information. The first validation information is obtained by processing the terminal communication mode information by the background system server. The second validation information is obtained by processing a balance of an electronic deposit, an online transaction number of an electronic deposit, a transaction amount, a transaction type identification, a terminal number, a transaction date and a transaction time by the background system server.

The validation data is obtained by processing the smart card communication mode information, a balance of an electronic deposit, an online transaction number of an electronic deposit, a transaction amount, a transaction type identification, a terminal number, a transaction date and a transaction time by the smart card.

The validation information is obtained by processing the terminal communication mode information, a balance of an electronic deposit, an online transaction number of an electronic deposit, a transaction amount, a transaction type identification, a terminal number, a transaction date and a transaction time by the smart card.

The processing is an encryption processing.

The validation data and the validation information are obtained in any of following ways, including: at least performing an MAC calculation on the smart card communication mode information and using a calculated MAC value as the validation data by the smart card, if the validation data generating strategy is an MAC calculation strategy; at least performing an HASH calculation on the smart card communication mode information and using a calculated HASH value as the validation data by the smart card, if the validation data generating strategy is an HASH calculation strategy; at least performing a signature calculation on the smart card communication mode information and using calculated signature information as the validation data by the smart card, if the validation data generating strategy is a signature strategy.

Performing by the smart card at least outputting smart card communication mode information, includes: acquiring an encoding strategy and processing at least the smart card communication mode information using the encoding strategy to obtain encoded data by the smart card; acquiring by the background system server the smart card communication mode information includes: acquiring the encoded data and a decoding strategy corresponding to the encoding strategy, and decoding the encoded data using the decoding strategy to obtain the smart card communication mode information by the background system server.

After acquiring the operation request, and before detecting the smart card communication mode information, the method further includes: determining whether the operation request is a pre-stored target request; if yes, detecting the communication mode information currently used by the smart card.

Furthermore, the contact communication mode includes: a chip communication mode and/or a magnetic stripe communication mode.

Performing by the smart card at least outputting smart card communication mode information, includes: performing by the smart card at least outputting the smart card communication mode information and type information of an object connected with the smart card by the smart card; after receiving the type information of the object connected with the smart card and before performing the flow of processing the operation request by the background system server, the method further includes: acquiring an object type of the terminal by the background system server, comparing the object type of the terminal with the type of the object connected with the smart card by the background system server, performing the flow of processing the operation request by the background system server after acquiring the operation request, if the object type of the terminal is identical to the type of the object connected with the smart card and the communication mode of the terminal interacted with the smart card is identical to the communication mode used by the smart card.

A system for processing information is provided, including: a first acquiring module in a smart card, configured to acquire an operation request from a terminal; a detecting module in the smart card, connected with the first acquiring module, configured to detect a communication mode currently used by the smart card after acquiring the operation request, wherein the communication mode of the smart card includes a contact communication mode and/or a non-contact communication mode; an outputting module in the smart card, connected with the detecting module, configured to perform at least outputting smart card communication mode information for indicating the communication mode currently used by the smart card; a second acquiring module in the terminal, connected with the outputting module, configured to acquire the smart card communication mode information; a transmitting module in the terminal, connected with the second acquiring module, configured to transmit the smart card communication mode information; a third acquiring module in a background system server, connected with the transmitting module, configured to acquire the smart card communication mode information and the terminal communication mode information; a comparing module in the background system server, connected with the third acquiring module, configured to compare the terminal communication mode information with the smart card communication mode information; a processing module in the background system server, connected with the comparing module, configured to perform processing the operation request after the background system server acquires the operation request, if the terminal communication mode information is identical to the smart card communication mode information.

The outputting module in the smart card is configured to acquire a validation data generating strategy, and to use the validation data generating strategy to process at least the smart card communication mode information to obtain validation data. The comparing module in the background system server is configured to acquire the validation data generating strategy, to use the validation data generating strategy to process at least the terminal communication mode information to obtain validation information; and to compare the validation information with the validation data.

The smart card communication mode information outputted by the outputting module includes any information as follows: first smart card communication mode information being the communication mode currently used by the smart card; second smart card communication mode information being the communication mode currently used by the smart card and a random number; third smart card communication mode information being the communication mode currently used by the smart card and a transaction count value; fourth smart card communication mode information being the communication mode currently used by the smart card, a random number, and a transaction count value. The terminal communication mode information acquired by the third acquiring module is a communication mode used by the terminal when transmitting the operation request if the smart card communication mode information is the first smart card communication mode information. The terminal communication mode information is the communication mode used by the terminal when transmitting the operation request and the random number if the smart card communication mode information is the second smart card communication mode information. The terminal communication mode information is the communication mode used by the terminal when transmitting the operation request and the transaction count value if the smart card communication mode information is the third smart card communication mode information. The terminal communication mode information is the communication mode used by the terminal when transmitting the operation request, the random number and the transaction count value if the smart card communication mode information is the fourth smart card communication mode information.

The validation data includes first validation data and second validation data. The first validation data is obtained by processing the smart card communication mode information by the smart card; the second validation data is obtained by processing a balance of an electronic deposit, an online transaction number of an electronic deposit, a transaction amount, a transaction type identification, a terminal number, a transaction date and a transaction time by the smart card.

The validation information includes first validation information and second validation information. The first validation information is obtained by processing the terminal communication mode information by the background system server. The second validation information is obtained by processing a balance of an electronic deposit, an online transaction number of an electronic deposit, a transaction amount, a transaction type identification, a terminal number, a transaction date and a transaction time by the background system server.

The validation data is obtained by processing the smart card communication mode information, a balance of an electronic deposit, an online transaction number of an electronic deposit, a transaction amount, a transaction type identification, a terminal number, a transaction date and a transaction time by the smart card. The validation information is obtained by processing the terminal communication mode information, a balance of an electronic deposit, an online transaction number of an electronic deposit, a transaction amount, a transaction type identification, a terminal number, a transaction date and a transaction time by the smart card.

The processing is an encryption processing.

The validation data and the validation information are obtained in any of following ways, including: at least performing an MAC calculation on the smart card communication mode information and using a calculated MAC value as the validation data by the smart card, if the validation data generating strategy is an MAC calculation strategy; at least performing an HASH calculation on the smart card communication mode information and using a calculated HASH value as the validation data by the smart card, if the validation data generating strategy is an HASH calculation strategy; at least performing a signature calculation on the smart card communication mode information and using calculated signature information as the validation data by the smart card, if the validation data generating strategy is a signature strategy.

The outputting module is configured to acquire an encoding strategy and to process at least the smart card communication mode information using the encoding strategy to obtain encoded data. The third acquiring module is configured to acquire the encoded data and a decoding strategy corresponding to the encoding strategy, and to decode the encoded data using the decoding strategy to obtain the smart card communication mode information.

The smart card further includes a determining module. After acquiring the operation request, and before detecting the smart card communication mode information, the determining module is configured to determine whether the operation request is a pre-stored target request, if yes, to detect the communication mode information currently used by the smart card.

The contact communication mode includes: a chip communication mode and/or a magnetic stripe communication mode.

The outputting module in the smart card is configured to perform at least outputting the smart card communication mode information and type information of an object connected with the smart card. After receiving the type information of the object connected with the smart card and before performing the flow of processing the operation request, the comparing module in the background system server is configured to acquire an object type of the terminal, to compare the object type of the terminal with the type of the object connected with the smart card, to perform the flow of processing the operation request after acquiring the operation request, if the object type of the terminal is identical to the type of the object connected with the smart card and the communication mode of the terminal interacted with the smart card is identical to the communication mode used by the smart card.

A smart card, includes: an acquiring module configured to acquire an operation request; a detecting module, connected with the acquiring module, configured to detect a communication mode currently used by the smart card after acquiring the operation request, wherein the communication mode of the smart card includes a contact communication mode and/or a non-contact communication mode; an outputting module, configured to perform at least outputting smart card communication mode information for indicating the communication mode currently used by the smart card.

The outputting module of the smart card is configured to acquire a validation data generating strategy, and to use the validation data generating strategy to process at least the smart card communication mode information to obtain validation data.

The smart card communication mode information outputted by the outputting module includes any information as follows: first smart card communication mode information being the communication mode currently used by the smart card; second smart card communication mode information being the communication mode currently used by the smart card and a random number; third smart card communication mode information being the communication mode currently used by the smart card and a transaction count value; fourth smart card communication mode information being the communication mode currently used by the smart card, a random number, and a transaction count value.

The validation data includes first validation data and second validation data. The first validation data is obtained by processing the smart card communication mode information by the smart card; the second validation data is obtained by processing a balance of an electronic deposit, an online transaction number of an electronic deposit, a transaction amount, a transaction type identification, a terminal number, a transaction date and a transaction time by the smart card.

The validation data is obtained by processing the smart card communication mode information, a balance of an electronic deposit, an online transaction number of an electronic deposit, a transaction amount, a transaction type identification, a terminal number, a transaction date and a transaction time by the smart card.

The processing is an encryption processing.

The validation data are obtained in any of following ways, including: at least performing an MAC calculation on the smart card communication mode information and using a calculated MAC value as the validation data by the smart card, if the validation data generating strategy is an MAC calculation strategy; at least performing an HASH calculation on the smart card communication mode information and using a calculated HASH value as the validation data by the smart card, if the validation data generating strategy is an HASH calculation strategy; at least performing a signature calculation on the smart card communication mode information and using calculated signature information as the validation data by the smart card, if the validation data generating strategy is a signature strategy.

The outputting module is configured to acquire an encoding strategy and to process at least the smart card communication mode information using the encoding strategy to obtain encoded data.

The smart card further includes a determining module. After acquiring the operation request, and before detecting the smart card communication mode information, the determining module is configured to determine whether the operation request is a pre-stored target request, if yes, to detect the communication mode information currently used by the smart card.

The contact communication mode includes: a chip communication mode and/or a magnetic stripe communication mode.

The outputting module in the smart card is configured to perform at least outputting the smart card communication mode information and type information of an object connected with the smart card.

It may be seen from the technical solution provided by the present disclosure that, after the smart card acquires the operation request, the smart card communication mode information is outputted. After outputting the smart card communication mode information, the terminal transmits the communication mode information used by the smart card to the background system server. The background system server compares the communication mode used by the smart card with the communication mode used by the terminal when transmitting the operation request. If the two communication modes are same, the flow of processing the operation request is performed so as to prevent a copy card from stealing information so as to avoid a problem of information danger, and to improve information security.

A smart card, includes: a communication interface, including a contact communication interface and/or a non-contact communication interface; a detecting chip, connected with the contact communication interface and/or the non-contact communication interface, configured to detect a communication state of the communication interface, to receive an operation request, and to output at least information for indicating the communication interface currently used by the smart card.

The contact communication interface includes: a chip communication interface and/or a magnetic stripe communication interface.

The smart card further includes: a smart card chip, connected with the contact communication interface and/or the non-contact communication interface.

The detecting chip is integrated in the smart card chip.

The detecting chip is a smart card chip in the smart card.

A processing system, includes: the smart card described above; a terminal, connected with the smart card, configured to receive the information of the communication interface currently used by the smart card and to transmit the information for indicating the communication interface currently used by the smart card; and a background system server connected with the terminal, and configured to receive and process the information for indicating the communication interface currently used by the smart card.

The terminal is a POS, an ATM, a read-write card device or a card-reading device.

It may be seen from the technical solution provided by the present disclosure that, the present disclosure includes the detecting chip connected with the contact communication interface and/or the non-contact communication interface for outputting the information of the communication interface currently used by the smart card, thus preventing a criminal from malicious stealing, improving the security of the smart card, and ensuring the security of information and property of the user.

It may be seen from the technical solution provided by the present disclosure that, the smart card generates the validation data according to the smart card operation information of the smart card, and the background system server performs the flow of responding to the operation request after the validation data passes the validation, so as to prevent user information from being stolen, to improve a security of the smart card, and to ensure a security of information and property of a user.

BRIEF DESCRIPTION OF THE DRAWINGS

In order to make technical solutions according to embodiments of the present disclosure more apparent, drawings used in descriptions of the embodiments will be illustrated in the following. Obviously, the drawings to be illustrated in the following only represent some embodiments of the present disclosure, and other drawings can be obtained according to these drawings by those having ordinary skills in the related art without making creative labors.

DETAILED DESCRIPTION

Figure 1:
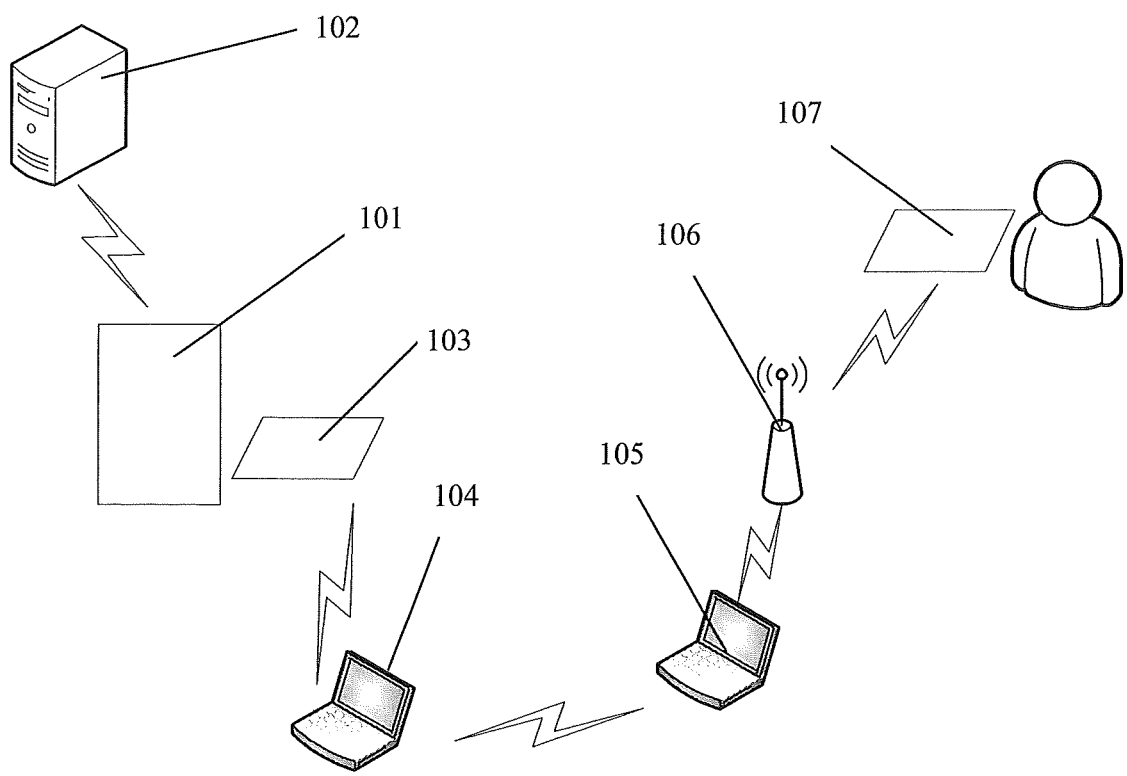
FIG. 1 is a schematic diagram showing stealing user information in a current smart card application.

The technical solution according to embodiments of the present disclosure will be described in the following with reference to drawings of the embodiments of the present disclosure. Obviously, the embodiments to be described only are some embodiments of the present disclosure, rather than all embodiments. Based on these embodiments of the present disclosure, other embodiments obtained by those having ordinary skills in the related art without making creative labors all fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

Embodiments of the present disclosure will be described in the following with reference to the drawings.

Figure 2:
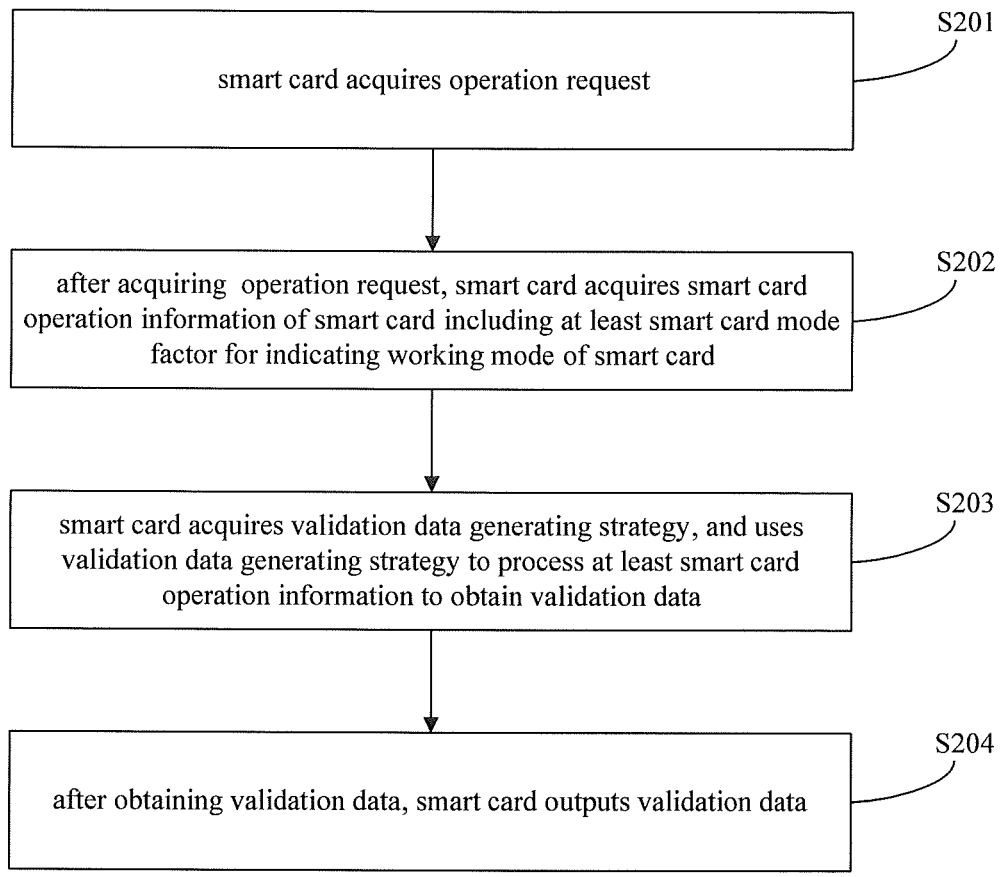
FIG. 2 is a flow chart of a method for outputting validation data according to an embodiment of the present disclosure.

FIG. 2 is a flow chart of a method for outputting validation data according to an embodiment of the present disclosure. The method for outputting validation data shown in FIG. 2 includes following steps.

In step S201, a smart card acquires an operation request.

Specifically, the smart card may acquire the operation request from a terminal, and the operation request acquired may be any operation request including: account transfer, cash withdrawal and enquiry.

The smart card may acquire the operation request from the terminal via a contact communication mode or a non-contact communication mode.

Sure, if user information is stolen during the smart card application as described in the background, the smart card in the present disclosure may acquire operation information via a second stealing terminal shown in FIG. 1.

Moreover, after acquiring the operation request in step S201 and before using a validation data generating strategy to process at least smart card operation information, the smart card may further perform following operations: determining whether the operation request is a pre-stored target request; if yes, using the validation data generating strategy to process at least the smart card operation information. It is determined whether the operation request is the pre-stored target request. The target request may be an operation request referring to a user's property security, such as account transfer, cash withdrawal. If the smart card determines that the operation request is the target request, the validation data generating strategy is used to process at least the smart card operation information. If it is determined that the operation request is not the target request, such as an enquiry operation request, it is not required to use the validation data generating strategy to process at least the smart card operation information because of no involving of user's property security, thus increasing a processing speed for such business.

In step S202, after acquiring the operation request, the smart card acquires the smart card operation information of the smart card. The smart card operation information includes at least a smart card mode factor for indicating a working mode of the smart card.

Specifically, the working mode of the smart card may include a communication mode of the smart card. The communication mode of the smart card may include a non-contact communication mode and/or a contact communication mode. The smart card mode factor is used for indicating the working mode of the smart card, that is, the smart card mode factor may be used to indicate that the smart card uses the non-contact communication mode or the contact communication mode. Sure, the contact communication mode may include a chip communication mode and/or a magnetic stripe communication mode. The smart card mode factor may be used to indicate that the smart card uses the chip communication mode of the contact communication mode or the magnetic stripe communication mode of the contact communication mode. The indicating of the communication mode of the smart card may ensure that information outputted by the smart card includes the communication mode of the smart card. Even the user information is stolen with a method described in the background, since the information outputted by the smart card includes the communication mode of the smart card, that is, the information outputted by the smart card includes the communication mode with the second stealing terminal. In this way, because the communication mode between the smart card and the second stealing terminal is non-contact, and the communication mode between a copy card and an ATM is contact, it may be determined by the background system server that the communication mode used by the smart card is different from the communication mode of the smart card when receiving information, and thus the flow of responding to the operation request is not allowed to be performed, ensuring the security of user information of the smart card.

Moreover, the smart card may further acquire a type of an object connected with the smart card from the terminal where the smart card acquires the operation information, thus acquiring the smart card mode factor. The type of the object connected with the smart card refers to a type of the terminal, and the terminal may include any type of terminal that may acquire the information of the smart card, such as a POS, an ATM, a read-write card or a card reading device. The smart card mode factor may indicate the type of the terminal. The indicating of the type of the terminal may ensure that information outputted by the smart card includes the type of the terminal connected with the smart card. Even the user information is stolen with a method described in the background, since the information outputted by the smart card includes the type of the terminal connected with the smart card, that is, the information outputted by the smart card includes the type of the second stealing terminal. In this way, because the type of the second stealing terminal is usually different from the type of the terminal such as ATM, it may be determined by the background system server that a way of outputting information by the smart card is different from a normal way, and thus the flow of responding to the operation request is not allowed to be performed, ensuring the security of user information of the smart card.

Moreover, the smart card operation information of the present disclosure may further include a random number besides the smart card mode factor. A random number generator may be disposed in the smart card so as to generate a different random number each time, thus ensuring that the validation data obtained when processing the smart card operation information later are different, which may prevent the validation data from being decoded. Sure, in order to make the background system server obtain the random number when validating the validation data, the random number may be outputted together with the outputting information by the smart card, or alternatively, a random number generator may be disposed in the background system server to generate a random number using an algorithm identical with that of the random number generator disposed in the smart card. The former makes the validation easier, while the latter makes the validation safer.

The smart card operation information of the present disclosure may further include a transaction count value besides the smart card mode factor. The transaction count value may be a count value generated by a counter disposed in the smart card. The counter performs a counting operation according to a preset method and outputs the transaction count value every time the smart card outputs data, thus ensuring that the validation data obtained when processing the smart card operation information later are different, which may prevent the validation data from being decoded. Sure, in order to make the background system server obtain the transaction count value when validating the validation data, the transaction count value may be outputted together with the outputting information by the smart card, or alternatively, the transaction count value may be obtained by counting with a counting method identical with that used by the smart card each time when the background system server performs a business related to the smart card. The former makes the validation easier, while the latter makes the validation safer.

Sure, the smart card operation information of the present disclosure may further include the smart card mode factor, the random number and the transaction count value, thus enabling a higher security.

In step S203, the smart card acquires the validation data generating strategy, and uses the validation data generating strategy to process at least the smart card operation information to obtain the validation data.

Specifically, the smart card may directly process the smart card operation information to obtain the validation data, or encrypts the smart card operation information to obtain the validation data. The direct processing is simple and has a high processing speed, while the encryption processing has a better security. The smart card also may acquire the validation data generating strategy corresponding to the smart card operation information from pre-stored validation data generating strategies.

For example, the validation data may be obtained via any one of methods as follows.

Method One: the smart card processes the smart card operation information to obtain first validation data, and processes a balance of an electronic deposit, an online transaction number of an electronic deposit, a transaction amount, a transaction type identification, a terminal number, a transaction date and a transaction time to obtain second validation data, and a combination of the first validation data and the second validation data is used as the validation data. In this case, processing the smart card operation information and processing the balance of the electronic deposit, the online transaction number of the electronic deposit, the transaction amount, the transaction type identification, the terminal number, the transaction date and the transaction time may use either a same processing method or different processing methods. Processing with the same method has a higher processing speed, and processing with different methods has a better security.

Method Two: the smart card processes the smart card operation information, a balance of an electronic deposit, an online transaction number of an electronic deposit, a transaction amount, a transaction type identification, a terminal number, a transaction date and a transaction time to obtain the validation data.

Method Three: the smart card encrypts the smart card operation information to obtain first validation data, and encrypts a balance of an electronic deposit, an online transaction number of an electronic deposit, a transaction amount, a transaction type identification, a terminal number, a transaction date and a transaction time to obtain second validation data, and a combination of the first validation data and the second validation data is used as the validation data. In this case, encrypting the smart card operation information and encrypting the balance of the electronic deposit, the online transaction number of the electronic deposit, the transaction amount, the transaction type identification, the terminal number, the transaction date and the transaction time may use either a same encrypting method or different encrypting methods. Encrypting with the same method has a higher processing speed, and encrypting with different methods has a better security. Sure, the smart card operation information may be encrypted, while the balance of the electronic deposit, the online transaction number of the electronic deposit, the transaction amount, the transaction type identification, the terminal number, the transaction date and the transaction time may not be encrypted; or alternatively, the smart card operation information may not be encrypted, while the balance of the electronic deposit, the online transaction number of the electronic deposit, the transaction amount, the transaction type identification, the terminal number, the transaction date and the transaction time may be encrypted, as long as the processed data may be validated in a following procedure.

Method Four: the smart card encrypts the smart card operation information, a balance of an electronic deposit, an online transaction number of an electronic deposit, a transaction amount, a transaction type identification, a terminal number, a transaction date and a transaction time to obtain the validation data.

Sure, the encryption processing in Method Three and Method Four above may be any one of encryption methods as follows.

The smart card at least performs an MAC calculation on the smart card operation information, if the validation data generating strategy is an MAC calculation strategy. In this case, the MAC value obtained by calculation may be used as the validation data, or a part of the MAC value obtained by calculation may be used as the validation data. The MAC calculation strategy has advantages of simple calculation and high processing speed.

The smart card at least performs an HASH calculation on the smart card operation information, if the validation data generating strategy is an HASH calculation strategy. In this case, the HASH value obtained by calculation may be used as the validation data, or a part of the HASH value obtained by calculation may be used as the validation data. The HASH calculation strategy has advantages of higher security.

The smart card at least performs a signature calculation on the smart card operation information, if the validation data generating strategy is a signature strategy. In this case, the signature data obtained by calculation may be used as the validation data, or a part of the signature data obtained by calculation may be used as the validation data. The signature strategy has advantages of high security and preventing denying.

In step S204, after obtaining the validation data, the smart card outputs the validation data.

Specifically, the smart card outputs the validation data to the terminal after obtaining the validation data, such that the terminal outputs the validation data to the background system server for validation. The related operations are performed after the validation is passed, which ensures the security of information and property of the user.

The method for outputting validation data may further include steps of: establishing a communication with a terminal by the smart card, and acquiring the operation request from the terminal via the communication by the smart card.

The method for outputting validation data further includes steps of: acquiring an outputting strategy corresponding to the validation data by the smart card, and outputting the validation data according to the outputting strategy of the validation data.

It may be seen that, with the method for outputting validation data according to embodiments of the present disclosure, the smart card generates the validation data according to the smart card operation information of the smart card, so as to prevent user information from being stolen, to improve the security of the smart card, and to ensure the security of information and property of the user.

Figure 3:
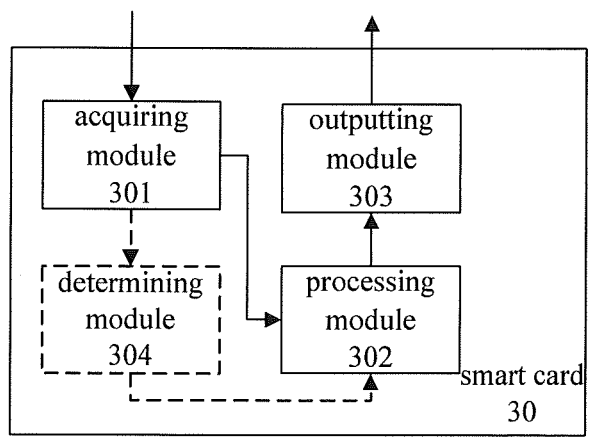
FIG. 3 is a schematic diagram of a smart card according to an embodiment of the present disclosure.

FIG. 3 is a schematic diagram of a smart card based on the method for outputting validation data described above. Since the smart card of the present disclosure uses the method for outputting validation data described above, which will not be described in detail herein, the structure of the smart card will be illustrated briefly.

With reference to FIG. 3, the smart card 30 of the present disclosure includes: an acquiring module 301, a processing module 302 and an outputting module 303.

The acquiring module 301 is configured to acquire an operation request, to acquire smart card operation information of the smart card after the operation request is acquired, and to acquire a validation data generating strategy. The smart card operation information includes at least a smart card mode factor for indicating a working mode of the smart card.

The processing module 302 is configured to use the validation data generating strategy to process at least the smart card operation information to obtain validation data.

The outputting module 303 is configured to output the validation data after the validation data is obtained by the processing module 302.

The smart card 30 may further include a communicating module, configured to establish a communication with a terminal and to output the validation data according to an outputting strategy of the validation data.

Sure, the processing module 302 of the smart card 30 may directly process the smart card operation information to obtain validation data, or may encrypt the smart card operation information to obtain the validation data. The direct processing is simple and high in processing speed, but the encryption processing has a better security.

For example, the processing module 302 may obtain the validation data via any one of methods as follows.

Method One: the processing module 302 is configured to process the smart card operation information to obtain first validation data, to process a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data.

Method Two: the processing module 302 is configured to process the smart card operation information, a balance of an electronic deposit, an online transaction number of an electronic deposit, a transaction amount, a transaction type identification, a terminal number, a transaction date and a transaction time to obtain the validation data.

Method Three: the processing module 302 is configured to encrypt the smart card operation information to obtain first validation data, to encrypt a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data. Sure, the smart card operation information may be encrypted, while the balance of the electronic deposit, the online transaction number of the electronic deposit, the transaction amount, the transaction type identification, the terminal number, the transaction date and the transaction time may not be encrypted; or alternatively, the smart card operation information may not be encrypted, while the balance of the electronic deposit, the online transaction number of the electronic deposit, the transaction amount, the transaction type identification, the terminal number, the transaction date and the transaction time may be encrypted, as long as the processed data may be validated in a following procedure.

Method Four: the processing module 302 is configured to encrypt the smart card operation information, a balance of an electronic deposit, an online transaction number of an electronic deposit, a transaction amount, a transaction type identification, a terminal number, a transaction date and a transaction time to obtain the validation data.

Sure, the encryption processing in Method Three and Method Four above for acquiring the validation data by the processing module 302 may be any one of encryption methods as follows.

The processing module 302 is configured to at least perform an MAC calculation on the smart card operation information, if the validation data generating strategy is an MAC calculation strategy.

The processing module 302 is configured to at least perform an HASH calculation on the smart card operation information, if the validation data generating strategy is an HASH calculation strategy.

The processing module 302 is configured to at least perform a signature calculation on the smart card operation information, if the validation data generating strategy is a signature strategy.

It may be seen that, with the smart card according to embodiments of the present disclosure, the smart card generates the validation data according to the smart card operation information of the smart card, so as to prevent user information from being stolen, to improve the security of the smart card, and to ensure the security of information and property of the user.

Moreover, the smart card 30 of the present disclosure may further include a determining module 304, configured to determine whether the operation request is a pre-stored target request after the operation request is acquired by the acquiring module 301, and to indicate the processing module 302 to use the validation data generating strategy to process at least the smart card operation information if the operation request is determined as the target request. In this way, a processing speed for business referring to the smart card is increased.

A working mode of the smart card of the present disclosure may include a communication mode of the smart card. The communication mode of the smart card includes a non-contact communication mode and/or a contact communication mode. The contact communication mode includes: a chip communication mode and/or a magnetic stripe communication mode.

Sure, functional modules of the smart card are simply divided in the embodiments of the present disclosure, which are not limited by above division. For example, the functions performed by respective modules of the smart card of the present disclosure may also be performed by several sub-modules. For example, the processing module may be divided into a first processing sub-module for performing a processing of Method One and a second processing sub-module for performing a processing of Method Two. Moreover, respective modules of the smart card of the present disclosure may also be integrated as one module for performing associated functions. Solutions should be within the protection scope of the present disclosure as long as they use the present disclosure.

Figure 4:
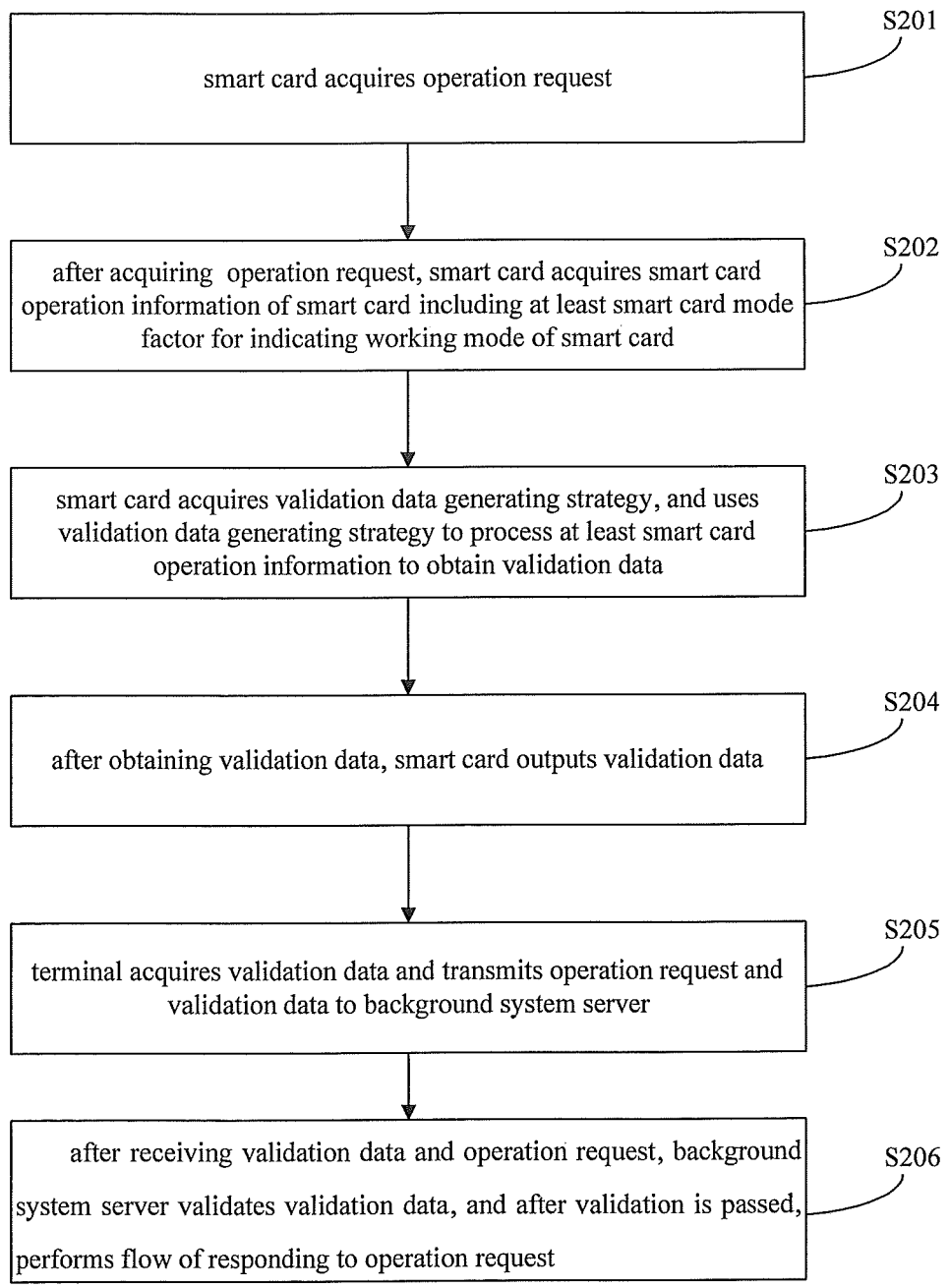
FIG. 4 is a flow chart of a method for responding to an operation request according to an embodiment of the present disclosure.

FIG. 4 is a flow chart of a method for responding to an operation request. Referring to FIG. 4, the method for responding to an operation request according to embodiments of the present disclosure includes: outputting at least validation data by a smart card using the method for outputting validation data (step S201-step S204) described above, which shall not be described in detail herein.

In step S205, the terminal acquires the validation data and transmits the operation request and the validation data to a background system server.

Specifically, the terminal may be an ATM, a POS, a smartphone or a panel computer or a PC connected with a card reader, a smartphone or a panel computer or a PC connected with an antenna, and the like.

In step S206, after receiving the validation data and the operation request, the background system server validates the validation data, and after the validation is passed, performs responding to the operation request.

Specifically, the background system server may be a server for a bank to realize related businesses of the bank, or may be a server for a third party, such as a bus card server. Servers used by various types of businesses closely related to user information may be the background system server of the present disclosure.

After receiving the validation data and the operation request, according to a communication mode of the smart card indicated by a smart card mode factor or a type of an object connected with the smart card indicated by a smart card mode factor, the background system server may validate the validation data via following methods.

The background system server acquires a communication mode of the terminal and acquires a target strategy identical to the validation data generating strategy acquired by the smart card; validates the communication mode of the terminal using the target strategy to generate first validation information; and compares the first validation information with validation data corresponding to the smart card mode factor in the validation data. If the first validation information is identical to the validation data corresponding to the smart card mode factor in the validation data, the validation is passed; or else, the validation is failed. In this case, if a scene of stealing user information with a method described in the background occurs, because the smart card is connected with a second stealing terminal connected with the antenna, and the validation data outputted by the smart card contains a non-contact communication mode, however, a terminal connected with a copy card is an ATM, and a communication mode of the terminal acquired by the background system server is a contact communication mode, the validation data cannot pass the validation of the background system server, thus ensuring a security of user information.

If the validation data further includes data obtained by processing the type of the object connected with the smart card, the background system server acquires an object type of the terminal; validates the communication mode information of the terminal using the target strategy to generate second validation information; compares the second validation information with validation data corresponding to the type of the object connected with the smart card in the validation data. If the second validation information is identical to the validation data corresponding to the type of the object connected with the smart card in the validation data, the validation is passed; or else, the validation is failed. The type of the terminal is an ATM, a POS, a smartphone connected with a card reader and the like. In this case, if a scene of stealing user information with the method described in the background occurs, because the smart card is connected with the second stealing terminal connected with the antenna, and the validation data outputted by the smart card contains the type of the second stealing terminal, however, the terminal connected with the copy card is an ATM, and the object type of the terminal acquired by the background system server is the ATM, the validation cannot be passed, thus ensuring the security of user information.

It may be seen that, the smart card generates the validation data according to the smart card operation information of the smart card, and the background system server performs the flow of responding to the operation request after the validation data passes the validation, so as to prevent user information from being stolen, to improve the security of the smart card, and to ensure the security of information and property of the user.

Figure 5:
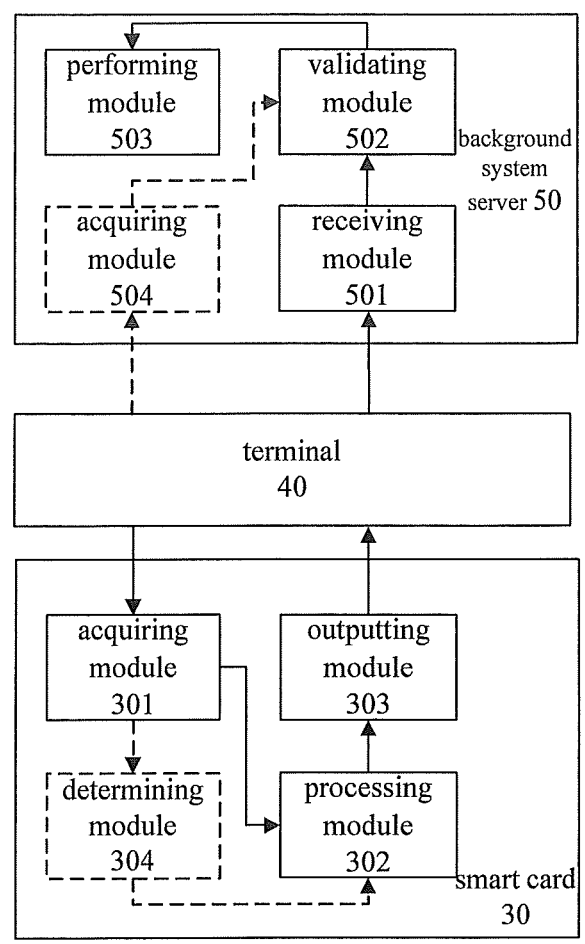
FIG. 5 is a schematic diagram of a system for responding to an operation request.

FIG. 5 is a schematic diagram of a system for responding to an operation request. Referring to FIG. 5, the system for responding to an operation request according to embodiments of the present disclosure includes: a terminal 40, a background system server 50 and the smart card 30 shown in FIG. 3. Since the smart card 30 is the smart card 30 described above, it will not be described in detail herein. Only the terminal 40 and the background system server 50 are illustrated below.

The terminal 40 is configured to acquire the validation data outputted by the smart card 30 and to transmit at least the operation request and the validation data to the background system server 50.

The background system server includes a receiving module 501, a validating module 502 and a performing module 503.

The receiving module 501 is configured to receive the validation data and the operation request transmitted by the terminal 40.

The validating module 502 is configured to validate the validation data after the validation data and the operation request are received by the receiving module 501.

The performing module 503 is configured to perform responding to the operation request after the validation is passed by the validating module.

Moreover, after receiving the validation data and the operation request, according to a communication mode of the smart card indicated by a smart card mode factor or a type of an object connected with the smart card indicated by a smart card mode factor, the background system server 50 may validate the validation data via following methods. In this case, the background system server 50 may further include an acquiring module 504.

The acquiring module 504 is configured to acquire a communication mode of the terminal 40 and to acquire a target strategy identical to the validation data generating strategy acquired by the smart card. The validating module 502 is further configured to validate the communication mode of the terminal using the target strategy to generate first validation information, to compare the first validation information with validation data corresponding to the smart card mode factor in the validation data, to pass the validation if the first validation information is identical to the validation data corresponding to the smart card mode factor in the validation data, and to fail the validation if the first validation information is different from the validation data corresponding to the smart card mode factor in the validation data.

If the validation data further includes data obtained by processing the type of the object connected with the smart card, the acquiring module 504 of the background system server 50 is further configured to acquire an object type of the terminal. The validating module 502 is further configured to validate the communication mode information of the terminal using the target strategy to generate second validation information; to compare the second validation information with validation data corresponding to the type of the object connected with the smart card in the validation data, to pass the validation if the second validation information is identical to the validation data corresponding to the type of the object connected with the smart card in the validation data, and to fail the validation if the second validation information is different from the validation data corresponding to the type of the object connected with the smart card in the validation data.

It may be seen that, the smart card generates the validation data according to the smart card operation information of the smart card, and the background system server performs the flow of responding to the operation request after the validation data passes the validation, so as to prevent user information from being stolen, to improve the security of the smart card, and to ensure the security of information and property of the user.

Sure, functional modules of the smart card and the background system server are simply divided in the embodiments of the present disclosure, which are not limited by above division. For example, the functions performed by respective modules of the smart card and the background system server of the present disclosure may also be performed by several sub-modules. For example, the processing module of the smart card may be divided into a first processing sub-module for performing a processing of Method One and a second processing sub-module for performing a processing of Method Two; the validating module of the background system server may be divided into a first validating sub-module for validating the communication mode of the smart card indicated by the smart card mode factor and a second validating sub-module for validating the type of the object connected with the smart card indicated by the smart card mode factor. Moreover, respective modules of the smart card and the background system server of the present disclosure may also be integrated as one module for performing associated functions. Solutions should be within the protection scope of the present disclosure as long as they use the present disclosure.

Embodiments of the present disclosure further provide a smart card system. The smart card uses the method for outputting validation data described above, which shall not be described in detail herein. Only the smart card is illustrated briefly. The smart card system includes: a communication interface and a smart card chip.

The communication interface is configured to acquire an operation request and to output validation data after the validation data is obtained by the smart card chip.

The smart card chip is configured to acquire smart card operation information of the smart card after the operation request is acquired by the communication interface. The smart card operation information includes at least a smart card mode factor for indicating a working mode of the smart card. The smart card chip is configured to acquire a validation data generating strategy and to use the validation data generating strategy to process at least the smart card operation information to obtain the validation data.

The smart card chip may obtain the validation data via any one of methods as follows.

Method One: the smart card chip is configured to process the smart card operation information to obtain first validation data, to process a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data.

Method Two: the smart card chip is configured to process the smart card operation information, a balance of an electronic deposit, an online transaction number of an electronic deposit, a transaction amount, a transaction type identification, a terminal number, a transaction date and a transaction time to obtain the validation data.

Method Three: the smart card chip is configured to encrypt the smart card operation information to obtain first validation data, to encrypt a balance of an electronic deposit, an online transaction number of an electronic deposit, a transaction amount, a transaction type identification, a terminal number, a transaction date and a transaction time to obtain second validation data, and to use a combination of the first validation data and the second validation data as the validation data. Sure, the smart card operation information may be encrypted, while the balance of the electronic deposit, the online transaction number of the electronic deposit, the transaction amount, the transaction type identification, the terminal number, the transaction date and the transaction time may not be encrypted; or alternatively, the smart card operation information may not be encrypted, while the balance of the electronic deposit, the online transaction number of the electronic deposit, the transaction amount, the transaction type identification, the terminal number, the transaction date and the transaction time may be encrypted, as long as the processed data may be validated in a following procedure.

Method Four: the smart card chip is configured to encrypt the smart card operation information, a balance of an electronic deposit, an online transaction number of an electronic deposit, a transaction amount, a transaction type identification, a terminal number, a transaction date and a transaction time to obtain the validation data.

Sure, the encryption processing in Method Three and Method Four above for acquiring the validation data by the smart card chip may be any one of encryption methods as follows.

The smart card chip is configured to at least perform an MAC calculation on the smart card operation information, if the validation data generating strategy is an MAC calculation strategy.

The smart card chip is configured to at least perform an HASH calculation on the smart card operation information, if the validation data generating strategy is an HASH calculation strategy.

The smart card chip is configured to at least perform a signature calculation on the smart card operation information, if the validation data generating strategy is a signature strategy.

It may be seen that, with the smart card according to embodiments of the present disclosure, the smart card system generates the validation data according to the smart card operation information of the smart card, so as to prevent user information from being stolen, to improve the security of the smart card, and to ensure the security of information and property of the user.

Moreover, after the communication interface acquires the operation request, the smart card chip further determines whether the operation request is a pre-stored target request, and uses the validation data generating strategy to process at least the smart card operation information if the operation request is determined as the target request. In this way, a processing speed for business referring to the smart card is increased.

A working mode of the smart card of the present disclosure may include a communication mode of the smart card. The communication mode of the smart card includes a non-contact communication mode and/or a contact communication mode. The contact communication mode includes: a chip communication mode and/or a magnetic stripe communication mode.

Moreover, the smart card operation information may further include: a random number and/or a transaction count value.

Embodiments of the present disclosure further provide a computer system for responding to an operation request, including: a terminal, a background system server and the smart card system described above. Since the smart card system is the smart card system described above, it will not be described in detail herein. Only the terminal and the background system server are illustrated below.

The terminal is configured to acquire the validation data outputted by the above smart card system and to transmit at least the operation request and the validation data to the background system server.

The background system server includes a communicating module and a background system server CPU.

The communicating module is configured to receive the validation data and the operation request transmitted by the terminal.

The background system server CPU is configured to validate the validation data after the validation data and the operation request are received by the communicating module, and to perform responding to the operation request after the validation is passed by the validating module.

Moreover, after receiving the validation data and the operation request, according to a communication mode of the smart card indicated by a smart card mode factor or a type of an object connected with the smart card indicated by a smart card mode factor, the background system server CPU may validate the validation data via following methods. In this case, the background system server CPU is configured to acquire a communication mode of the terminal, to acquire a target strategy identical to the validation data generating strategy acquired by the smart card, to validate the communication mode of the terminal using the target strategy to generate first validation information, to compare the first validation information with validation data corresponding to the smart card mode factor in the validation data, to pass the validation if the first validation information is identical to the validation data corresponding to the smart card mode factor in the validation data, and to fail the validation if the first validation information is different from the validation data corresponding to the smart card mode factor in the validation data.

If the validation data further includes data obtained by processing the type of the object connected with the smart card, the background system server CPU is further configured to acquire an object type of the terminal, to validate the communication mode information of the terminal using the target strategy to generate second validation information; to compare the second validation information with validation data corresponding to the type of the object connected with the smart card in the validation data, to pass the validation if the second validation information is identical to the validation data corresponding to the type of the object connected with the smart card in the validation data, and to fail the validation if the second validation information is different from the validation data corresponding to the type of the object connected with the smart card in the validation data.

It may be seen that, the smart card system generates the validation data according to the smart card operation information of the smart card, and the background system server performs the flow of responding to the operation request after the validation data passes the validation, so as to prevent user information from being stolen, to improve the security of the smart card, and to ensure the security of information and property of the user.

A computer readable medium includes computer instructions, when executed, configured to implement the method for outputting validation data or the method for responding to the operation request.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for responding to an operation request, comprising:
    establishing a communication between a terminal and a smart card;
    acquiring, by the smart card, an operation request via the communication;
    acquiring, by the smart card, smart card operation information of the smart card, after acquiring the operation request, wherein the smart card operation information comprises at least a smart card mode factor for indicating a working mode of the smart card, and the working mode of the smart card comprises a non-contact communication mode and/or a contact communication mode;
    acquiring, by the smart card, a validation data generating strategy;
    processing, by the smart card and using the validation data generating strategy, at least the smart card operation information, wherein the processing generates validation data based on the smart card operation information outputting, by the smart card and to the terminal, the validation data after obtaining the validation data;
acquiring, by the terminal and from the smart card, the validation data;
    transmitting, by the terminal and to a background system server, at least the operation request, the validation data, and a communication mode of the terminal, wherein the communication mode of the terminal denotes whether the terminal is in contact or non-contact communication with the smart card; and
    after receiving the validation data, the operation request, and the communication mode of the terminal, validating, by the background system server, the validation data;
    acquiring, by the background system server and from the terminal, at least the operation request, the validation data, and the communication mode of the terminal;
    acquiring, by the background system server, a target strategy identical to the validation data generating strategy acquired by the smart card by the background system server;
    processing, by the background system server, the communication mode of the terminal using the target strategy, wherein the processing generates first validation data based on the communication mode of the terminal;
    comparing, by the background system server, the first validation information with validation data corresponding to the smart card mode factor in the validation data;
    determining, by the background system server, that the validation is successful based on a match between the first validation information and the validation data corresponding to the smart card mode factor; and
    after the validation is determined to be successful, responding, by the background system server, to the operation request.

2. The method according to claim 1, wherein the validation data further comprises data obtained by processing the type of the object connected with the smart card, and validating the validation data by the background system server further comprises:
    acquiring, by the background system server, an object type of the terminal;
    processing, by the background system server, the object type of the terminal using the target strategy to generate second validation information; and
    comparing, by the background system server, the second validation information with validation data corresponding to the type of the object connected with the smart card in the validation data, wherein determining, by the background system server, that the validation is successful is further based on a match between the second validation information and the validation data corresponding to the type of the object connected with the smart card.

3. The method according to claim 1, wherein the smart card acquires the validation data generating strategy corresponding to the smart card operation information from pre-stored validation data generating strategies.

4. The method according to claim 1, wherein using the validation data generating strategy to process at least the smart card operation information to obtain the validation data by the smart card comprises:
    processing the smart card operation information to obtain first validation data, and processing an account balance, a series number of a current transaction, a monetary amount of a current transaction, a transaction type identification, a terminal number, a transaction date and a transaction time to obtain second validation data, and using a combination of the first validation data and the second validation data as the validation data by the smart card.

5. The method according to claim 1, wherein using the validation data generating strategy to process at least the smart card operation information to obtain the validation data by the smart card comprises:
    processing the smart card operation information, an account balance, a series number of a current transaction, a monetary amount of a current transaction, a transaction type identification, a terminal number, a transaction date and a transaction time by the smart card to obtain the validation data.

6. The method according to claim 1, wherein outputting at least the validation data by the smart card further comprises:
    determining whether the operation request is a target request stored in advance, wherein the target request is a monetary transaction and comprises account transfer and cash withdrawal; and
    when determining that the operation request is the target request, using the validation data generating strategy to process at least the smart card operation information.

7. The method according to claim 1, wherein the smart card operation information further comprises: a random number and/or a transaction count value.

8. The method according to claim 1, wherein the contact communication mode comprises: a chip communication mode and/or a magnetic stripe communication mode.

9. The method according to claim 1, wherein the working mode of the smart card is determined according to a type of an object connected with the smart card.

10. A system for responding to an operation request, comprising:
a terminal, a background system server and a smart card, wherein, the smart card is configured to:
output at least validation data, wherein the validation data corresponds to a smart card communication mode, wherein the communication mode denotes that the smart card is in noncontact or contact communication with the terminal;
the terminal is configured to acquire, from the smart card, the validation data;
transmit, to the background system server, at least the operation request, the validation data, and a communication mode of the terminal, wherein the communication mode denotes that the terminal is in noncontact or contact communication with the smart card;
the background system server is configured to:
receive, from the terminal, at least the validation data, the operation request, and the communication mode of the terminal;
acquire a target strategy identical to the validation data generating strategy acquired by the smart card;
validate the communication mode of the terminal using the target strategy to generate first validation information;
compare the first validation information with validation data corresponding to the smart card mode factor in the validation data;
determine that the validation is successful when the first validation information is identical to the validation data corresponding to the smart card mode factor in the validation data;
determine that the validation failed if the first validation information is different from the validation data corresponding to the smart card mode factor in the validation data; and
respond to the operation request if the validation is successful.

11. The system according to claim 10, wherein the validation data further comprises data obtained by processing the type of the object connected with the smart card, and the background system server is further configured to:
acquire, from the terminal, an object type of the terminal;
validate the communication mode information of the terminal using the target strategy to generate second validation information;
compare the second validation information with validation data corresponding to the type of the object connected with the smart card in the validation data;
determine that the validation is successful when the second validation information is identical to the validation data corresponding to the type of the object connected with the smart card in the validation data; and
determine that the validation failed when the second validation information is different from the validation data corresponding to the type of the object connected with the smart card in the validation data.

12. The system according to claim 10, wherein the smart device is configured to output at least the validation data by:
establishing a communication with the terminal by the smart card;
acquiring the operation request from the terminal via the communication by the smart card;
acquiring smart card operation information of the smart card by the smart card, after acquiring the operation request, wherein the smart card operation information comprises at least a smart card mode factor for indicating a working mode of the smart card, and the working mode of the smart card comprises a noncontact communication mode and/or a contact communication mode;
acquiring a validation data generating strategy, and using the validation data generating strategy to process at least the smart card operation information to obtain validation data by the smart card; and
outputting the validation data by the smart card after obtaining the validation data.

13. The system according to claim 10, wherein the smart card is further configured to:
process the smart card operation information to obtain first validation data, and processing an account balance, a series number of a current transaction, a monetary amount of a current transaction, a transaction type identification, a terminal number, a transaction date and a transaction time to obtain second validation data, and using a combination of the first validation data and the second validation data as the validation data by the smart card.

14. The system according to claim 10, wherein the smart card is further configured to:
process the smart card operation information, an account balance, a series number of a current transaction, a monetary amount of a current transaction, a transaction type identification, a terminal number, a transaction date and a transaction time by the smart card to obtain the validation data.

15. The system according to claim 10, wherein the smart card is further configured to:
determine whether the operation request is a target request stored in advance, wherein the target request in a monetary transaction and comprises account transfer and cash withdrawal; and
when determining that the operation request is the target request, use the validation data generating strategy to process at least the smart card operation information.

16. A non-transitory computer readable medium, comprising computer instructions that when executed by one or more processing devices, causes the applicable processing devices to perform the following acts:
establishing a communication between a terminal and a smart card;
acquiring, by the smart card, an operation request via the communication by the smart card;
acquiring, by the smart card, smart card operation information of the smart card, after acquiring the operation request, wherein the smart card operation information comprises at least a smart card mode factor for indicating a working mode of the smart card, and the working mode of the smart card comprises a noncontact communication mode and/or a contact communication mode;
acquiring, by the smart card, a validation data generating strategy;

processing, by the smart card and using the validation data generating strategy, at least the smart card operation information, wherein the processing generates validation data based on the smart card operation information;

outputting, by the smart card and to the terminal, the validation data after obtaining the validation data;

acquiring, by the terminal and from the smart card, the validation data;

transmitting, by the terminal and to a background system server, at least the operation request, the validation data, and a communication mode of the terminal, wherein the communication mode of the terminal denotes whether the terminal is in contact or non-contact communication with the smart card;

after receiving the validation data, the operation request, and the communication mode of the terminal, validating, by the background system server, the validation data;

acquiring, by the background system server and from the terminal, at least the operation request, the validation data, and the communication mode of the terminal;

acquiring, by the background system server, a target strategy identical to the validation data generating strategy acquired by the smart card by the background system server;

processing, by the background system server, the communication mode of the terminal using the target strategy, wherein the processing generates first validation data based on the communication mode of the terminal;

comparing, by the background system server, the first validation information with validation data corresponding to the smart card mode factor in the validation data;

determining, by the background system server, that the validation is successful based on a match between the first validation information and the validation data corresponding to the smart card mode factor; and after the validation is determined to be successful, responding, by the background system server, to the operation request.

17. The non-transitory computer readable medium according to claim 16, wherein when the second computer instructions are executed, following acts are implemented:

acquiring an object type of the terminal by the background system server;

validating the object type of the terminal using the target strategy to generate second validation information by the background system server;

comparing the second validation information with validation data corresponding to the type of the object connected with the smart card in the validation data by the background system server;

determining that the validation is successful, if the second validation information is identical to the validation data corresponding to the type of the object connected with the smart card in the validation data; and determining that the validation failed, if the second validation information is different from the validation data corresponding to the type of the object connected with the smart card in the validation data.

* * * * *